US009858861B2

(12) United States Patent
Umeda et al.
(10) Patent No.: US 9,858,861 B2
(45) Date of Patent: Jan. 2, 2018

(54) METHOD OF DRIVING A DISPLAY DEVICE

(71) Applicant: Japan Display Inc., Tokyo (JP)

(72) Inventors: Yutaka Umeda, Tokyo (JP); Duzen Peng, Tokyo (JP); Ilin Wu, Tokyo (JP); Makoto Shibusawa, Tokyo (JP); Hiroyuki Kimura, Tokyo (JP)

(73) Assignee: Japan Display Inc., Tokyo (JP)

( * ) Notice: Subject to any disclaimer, the term of this patent is extended or adjusted under 35 U.S.C. 154(b) by 161 days.

(21) Appl. No.: 15/016,011

(22) Filed: Feb. 4, 2016

(65) Prior Publication Data

US 2016/0232841 A1 Aug. 11, 2016

(30) Foreign Application Priority Data

Feb. 10, 2015 (JP) ................................ 2015-023899

(51) Int. Cl.
*G06F 3/038* (2013.01)
*G09G 5/00* (2006.01)
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/0251* (2013.01); *G09G 2310/0254* (2013.01); *G09G 2320/0214* (2013.01)

(58) Field of Classification Search
None
See application file for complete search history.

(56) References Cited

FOREIGN PATENT DOCUMENTS

| | | | |
|---|---|---|---|
| JP | 2014-085384 A | | 5/2014 |
| JP | 2014085384 A | * | 5/2014 |

* cited by examiner

*Primary Examiner* — Ilana Spar
*Assistant Examiner* — Kirk Hermann
(74) *Attorney, Agent, or Firm* — TYPHA IP LLC

(57) ABSTRACT

A method of driving a display device with a plurality of pixels including a video signal wire, a first power supply wire supplied with a first potential, a second power supply wire supplied with a second potential different to the first potential, a light emitting element arranged between the first power supply wire and the second power supply wire, a drive transistor controlling a value of a current supplied to the light emitting element, and a switch arranged between the video signal wire and the drive transistor, and inputting a signal of the video signal wire to a gate terminal of the drive transistor, wherein a minimum gradation level potential is supplied to the video signal wire after a video signal is written to the capacitor of an Nth row pixel until a video signal is written to the capacitor of an Mth (N<M) row pixel.

14 Claims, 14 Drawing Sheets

METHOD OF DRIVING A DISPLAY DEVICE

CROSS REFERENCE TO RELATED APPLICATIONS

This application is based upon and claims the benefit of priority from the prior Japanese Patent Application No. 2015-023899, filed on 10 Feb. 2015, the entire contents of which are incorporated herein by reference.

FIELD

The present invention is related to a method of driving a display device arranged with a display part including a plurality of pixels. In particular, the present invention is related to a method of driving an EL display device including a light emitting element such as an electro luminescence element in each pixel.

BACKGROUND

An electroluminescence element (referred to herein as [EL element]) is known as a light emitting element which utilizes an electroluminescence phenomenon. The EL element has a structure in which an EL material which becomes a light emitting material is sandwiched between an anode and a cathode and emits light at a wavelength according to the type of EL material.

When a certain voltage is applied between the anode and cathode of the EL element, a current flows between the anode and cathode and the EL material emits light at a luminosity according to the value of the current. Therefore, by controlling the value of the current supplied to the EL element, it is possible to make the EL element emit light at a desired luminosity.

A pixel circuit of a conventional display device includes a drive transistor which controls the value of a current supplied to an EL element in each pixel display devices in recent years, because gradation control capabilities at a high level are being demanded, the drive transistor is required to very finely control a current value. As a result, a technology for removing the effects of a variation in drive transistor characteristics has become important.

Various pixel circuits have been developed in order to correct the characteristics of a drive transistor (threshold value or mobility for example). However, as a result, the number of transistors or the number of control wires within a pixel has increased which is an obstacle to achieving high definition of the EL display device.

Therefore, a technology has been proposed in Japanese Laid Open Patent No. 2014-85384 for example which realizes simplification of required elements and wires using two transistors and one capacitor as a means for achieving an EL display device with high definition.

SUMMARY

One aspect of the present invention is a method of driving a display device arranged with a display part including a plurality of pixels wherein at least one pixel of the plurality of pixels includes a video signal wire, a first power supply wire supplied with a first potential, a second power supply wire supplied with a second potential different to the first potential, a light emitting element arranged between the first power supply wire and the second power supply wire, a drive transistor arranged between the first power supply wire and the light emitting element, and controlling a value of a current supplied to the light emitting element, a switch arranged between the video signal wire and a gate terminal of the drive transistor, and inputting a signal of the video signal wire to the gate terminal of the drive transistor, and a capacitor arranged between the gate terminal and a source terminal of the drive transistor, a minimum gradation level potential is supplied to the video signal wire after a video signal is written to the capacitor of an Nth row pixel until a video signal is written to the capacitor of an Mth (N<M) row pixel. The minimum gradation level potential may be a potential lower than a potential added with 0.5V to a potential corresponding to a minimum gradation.

One aspect of the present invention is a method of driving a display device arranged with a display part including a plurality of pixels wherein at least one pixel of the plurality of pixels includes a video signal wire, a first power supply wire is supplied mutually exclusively with a first potential or a second potential different to the first potential, a second power supply wire supplied with a third potential different to the first potential and second potential, a light emitting element arranged between the first power supply wire and the second power supply wire, a drive transistor arranged between the first power supply wire and the light emitting element, and controlling a value of a current supplied to the light emitting element, a switch arranged between the video signal wire and a gate terminal of the drive transistor, and inputting a signal of the video signal wire to the gate terminal of the drive transistor, and a capacitor arranged between the gate terminal and a source terminal of the drive transistor, a minimum gradation level potential is supplied to the video signal wire after a video signal is written to the capacitor of an Nth row pixel until a video signal is written to the capacitor of an Mth (N<M) row pixel. The minimum gradation level potential may be a potential lower than a potential added with 0.5V to a potential corresponding to a minimum gradation.

DESCRIPTION OF EMBODIMENTS

Figure 11:
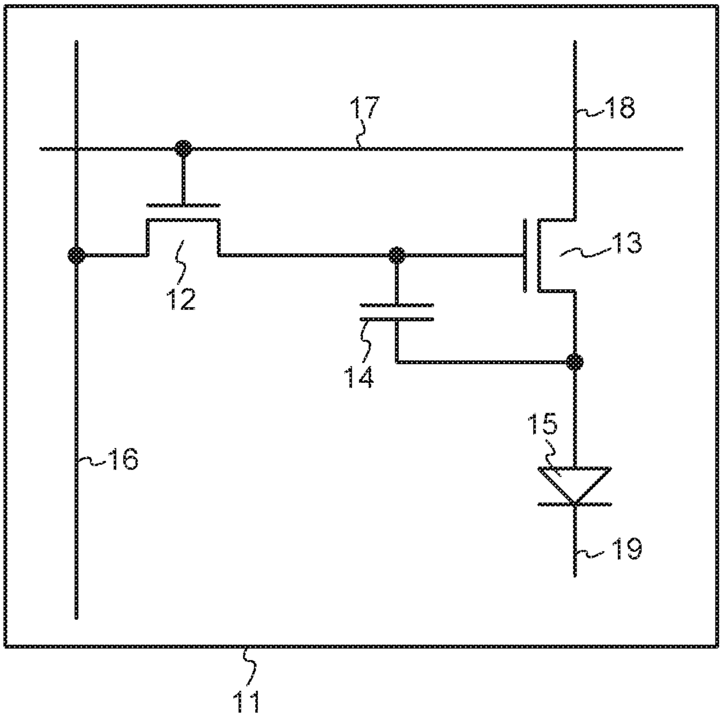
FIG. 11 is a diagram for explaining a basic operation of a simplified pixel circuit in a conventional EL display device.

FIG. 11 is a diagram for explaining the basic operation of a simplified pixel circuit in a comparative example of EL display device. The EL display device shown in FIG. 11 includes a plurality of pixels 11 arranged in a matrix shape. Two transistors 12, 13, one capacitor 14 and a light emitting element 15 are included in each pixel 11. The source/drain terminals of the first transistor 12 are connected to the gate terminal of the second transistor 13 and the capacitor 14. In addition, the source terminal of the second transistor 13 is connected to the capacitor 14 and the light emitting element 15.

A video signal wire 16 (data wire) is connected to the source/drain terminal of the first transistor 12. A signal selection gate wire 17 is connected to the gate terminal of the first transistor 12. A first power supply wire 18 is connected to the drain terminal of the second transistor 13 and to the anode of the light emitting element 15 via the second transistor 12. A second power supply wire 19 is connected to the cathode of the light emitting element 15.

In this type of circuit structure, when the first transistor 12 which functions as a switch becomes an ON state, a video signal supplied to the video signal wire 16 is written to the gate terminal of the second transistor 13 and the capacitor 14. In addition, the value of a current flowing through the second transistor 13 is controlled by a potential difference between a voltage of the video signal supplied to one electrode of the capacitor 14 and the voltage supplied to the source terminal of the second transistor 13 supplied to the other electrode of the capacitor 14. The light emitting element 15 emits light at a luminosity according to the value of the current controlled in this way.

However, as a result of proceeding with research by the inventors of the present invention, it was understood that cross talk caused by a current leaked to the video signal wire 16 of the first transistor 12 affects an image when certain conditions overlap. This is explained below.

Figure 12:
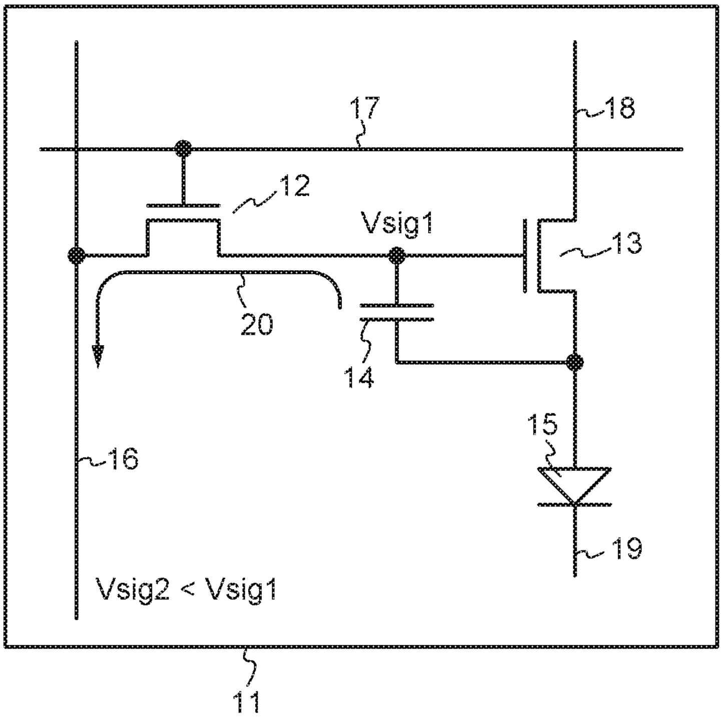
FIG. 12 is a diagram for explaining the cause for the occurrence of a current leak in a first transistor 12.

FIG. 12 is a diagram for explaining the cause of a current leak to the first transistor 12. For example, a certain video signal (for example, Vsig1=4V) is written to the capacitor 14 in a pixel with the coordinates (n,m). In this case, ideally the video signal (Vsig1) is still written to the capacitor 14 in a pixel with the coordinates (n,m) until a 1 frame time period is completed.

Here, in a pixel with the coordinates (p,m) in a p>n relationship, a video signal (for example, Vsig=0V) with a significantly lower voltage than the video signal (Vsig1) is written to the capacitor 14. At this time, a large potential difference corresponding to (Vsig1−Vsig2) is produced between the source terminal and drain terminal of the first transistor 12 and a light leak current 20 is generated. Although this leak current 20 is extremely weak, if it is generated for a long period of time, there is danger that the voltage stored in the capacitor 14 may be affected.

Figure 13A:
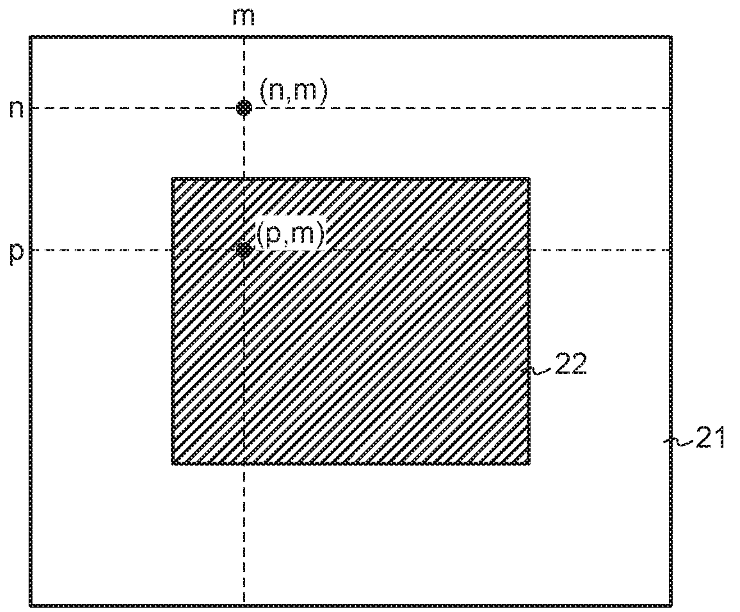
FIG. 13A is a diagram for explaining an example of cross talk caused by a specific pattern.
Figure 13B:
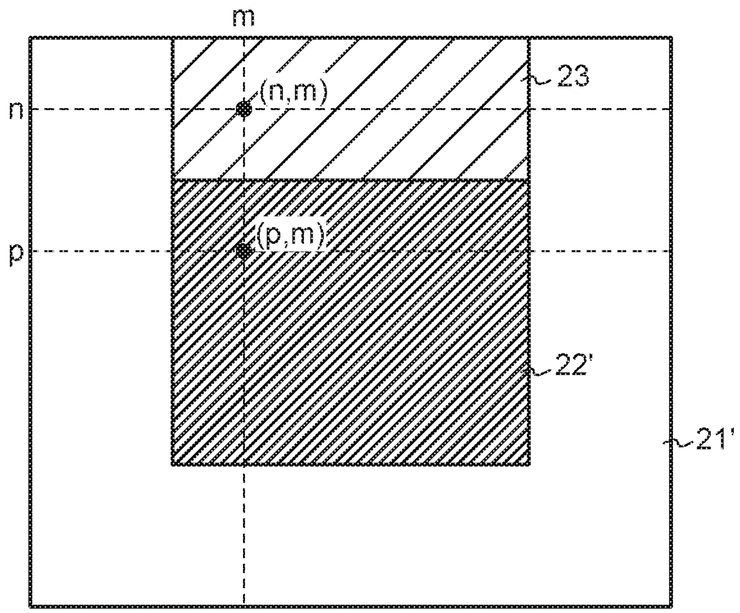
FIG. 13B is a diagram for explaining an example of cross talk caused by a specific pattern.

FIG. 13A and FIG. 13B are diagram for explaining an example of cross talk which is caused by a specific pattern. Here, FIG. 13A shows a pattern of an image intended to be displayed and FIG. 13B shows an image in the EL display device in which the image pattern is displayed.

An image pattern for displaying a black window 22 at the center of a single color background 21 is shown in FIG. 13A. In addition, a pixel with the coordinates (n,m) and a pixel with the coordinates (p,m) are shown in FIG. 13A. A video signal for displaying this image pattern is written in sequence to the capacitor 14 of each pixel.

FIG. 13B shows a display image in the case where the image pattern shown in FIG. 13A is displayed. As is shown in FIG. 13B, a black window 22' is displayed at the center of a background 21' following the image pattern. However, when the current leak 20 described above is generated, a dim background 23 may be displayed on the upper part of the black window 22'. That is, cross talk caused by the current leak 20 can be generated on the upper part of the black window 22'.

After a video signal (Vbg) corresponding to the background 21 at the coordinates (n,m) is written in the case where the image pattern shown in FIG. 13A is displayed, a video signal (Vbw) corresponding to the lower part black window 22 is supplied to the video signal wire 16 over a plurality of horizontal scanning time periods. As a result, the current leak 20 is generated via the first transistor 12 described above every time the video signal (Vbw) is supplied to the video signal wire 16 corresponding to the black window 22, and the voltage stored in the capacitor 14 is reduced little by little. A reduction in the voltage stored in the capacitor 14 invites a reduction in the value of a current flowing through the second transistor 13 described above and causes a drop in luminosity of the light emitting element 15. As a result, a slightly dimmer background 23 than the background 21' is displayed on the upper part of the black window 22'.

Figure 14:
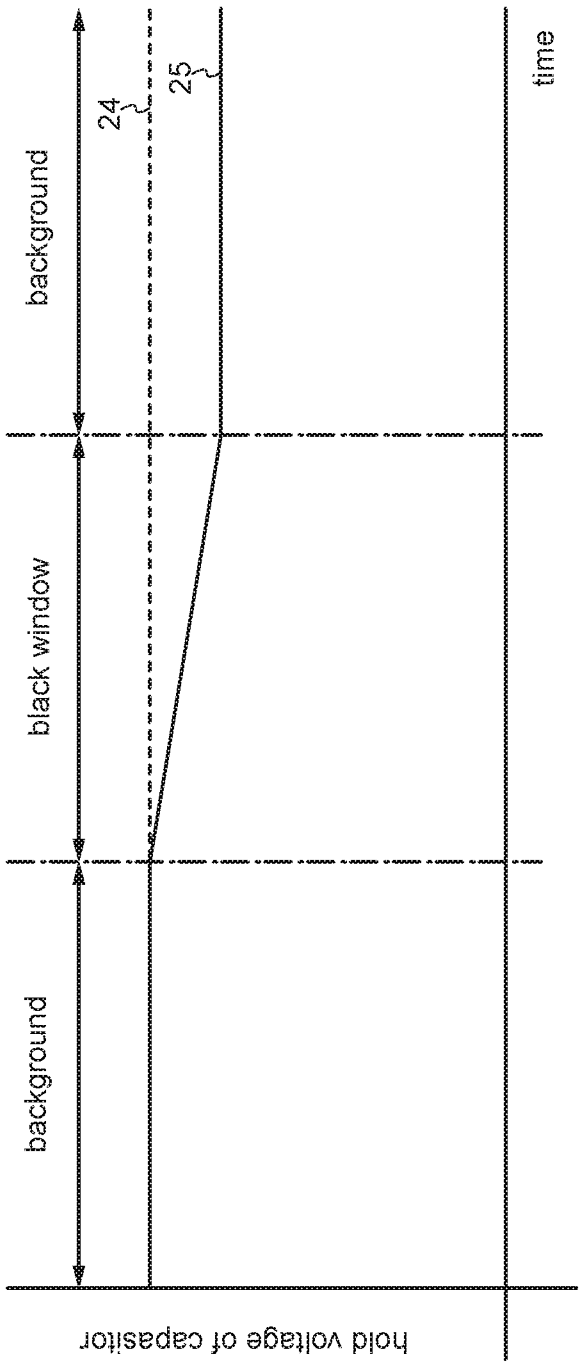
FIG. 14 is a diagram showing a time variation of a voltage stored by a capacitor 14 in a pixel at a specific coordinate.

FIG. 14 is a diagram showing a time variation of a voltage stored by the capacitor 14 of a pixel with the coordinates (p,m) shown in FIG. 13B. The dotted line indicates a voltage variation of a capacitor in a pixel arranged in a column that does not include the black window 22, and the solid line indicates a voltage variation of a capacitor in a pixel arranged in a column that includes the black window 22.

As is shown by the solid line 25 in FIG. 14, the voltage stored in the capacitor 14 gradually decreases while a video signal (Vbw) corresponding to the black window 22 is written to another pixel. As a result, the voltage stored in the capacitor 14 finally drops the level shown by the solid line 25 and light emitting luminosity also drops. On the other hand, as is shown by the dotted line 24, a variation in voltage of the capacitor 14 is not observed in a pixel in a column which does not include the black window 22.

In this case, although it is ideal to eliminate a current leak of the first transistor 12, it is difficult to form a transistor with such high performance without variation and this is likely to invite a drop in yield of a manufacture process as a result.

Therefore, the present invention aims to provide a driving method of a display device for reducing the effects of cross talk which is locally generated.

Each embodiment of the present invention is explained below while referring to the diagrams. However, the present invention can be realized using various forms within a scope that does not depart from the concept of the present invention, and should not be interpreted as being limited to the content described in the embodiments exemplified below. In addition, in the present specification and each diagram, the same reference symbols are attached to elements in the diagrams that have already been explained or have the same or similar functions and overlapping explanations may be omitted.

First Embodiment

<Structure of a Display Device>

Figure 1:
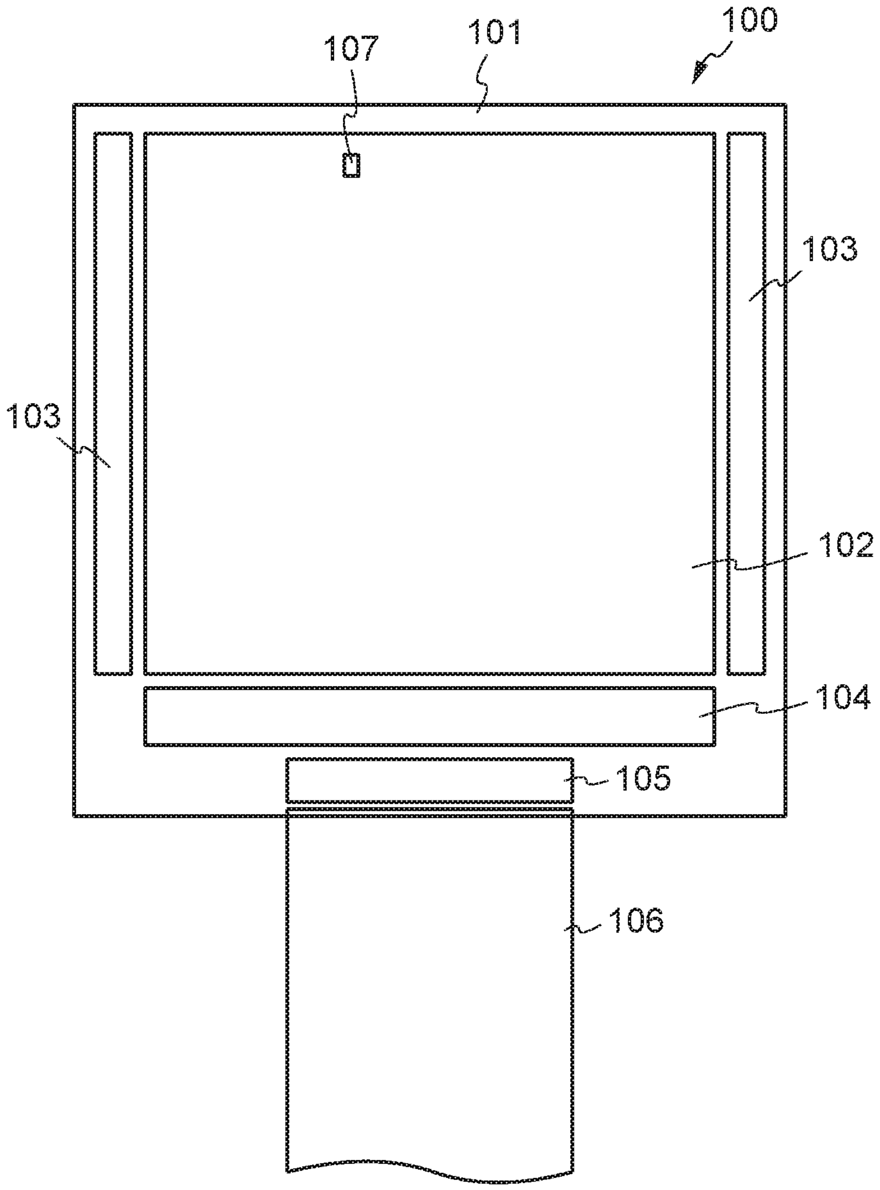
FIG. 1 is a diagram showing a schematic structure in an EL display device related to a first embodiment of the present invention.

FIG. 1 is a diagram showing a schematic structure of an EL display device 100 related to the first embodiment of the present invention. The EL display device 100 is arranged with a display part (display region) 102, a scanning wire drive circuit 103, a video signal wire drive circuit 104 and logic circuit 105 formed above a substrate 101. The logic circuit 105 functions as a control part providing a timing signal etc to the scanning wire drive circuit 103 and video signal wire drive circuit 104. A FPC (Flexible Printed Circuit) 106 is a terminal for inputting a signal supplied from the exterior to the EL display device 100.

Furthermore, the video signal wire drive circuit 104 may include the logic circuit 105. In addition, although the logic circuit 105 is shown as being arranged by a flip chip method etc above the substrate 101 in FIG. 1, the logic circuit 105 may also be arranged and connected to the FPC 106.

A plurality of pixels 107 is arranged in a matrix shape in the display part 102. A video signal is provided from the video signal wire drive circuit 104 according to video to be displayed in each pixel 107. By providing a current value controlled corresponding to these video signals to the light emitting element of each pixel, it is possible to display video in response to a video signal. Control of the current value provided to the light emitting element can be performed using a transistor.

Figure 2:
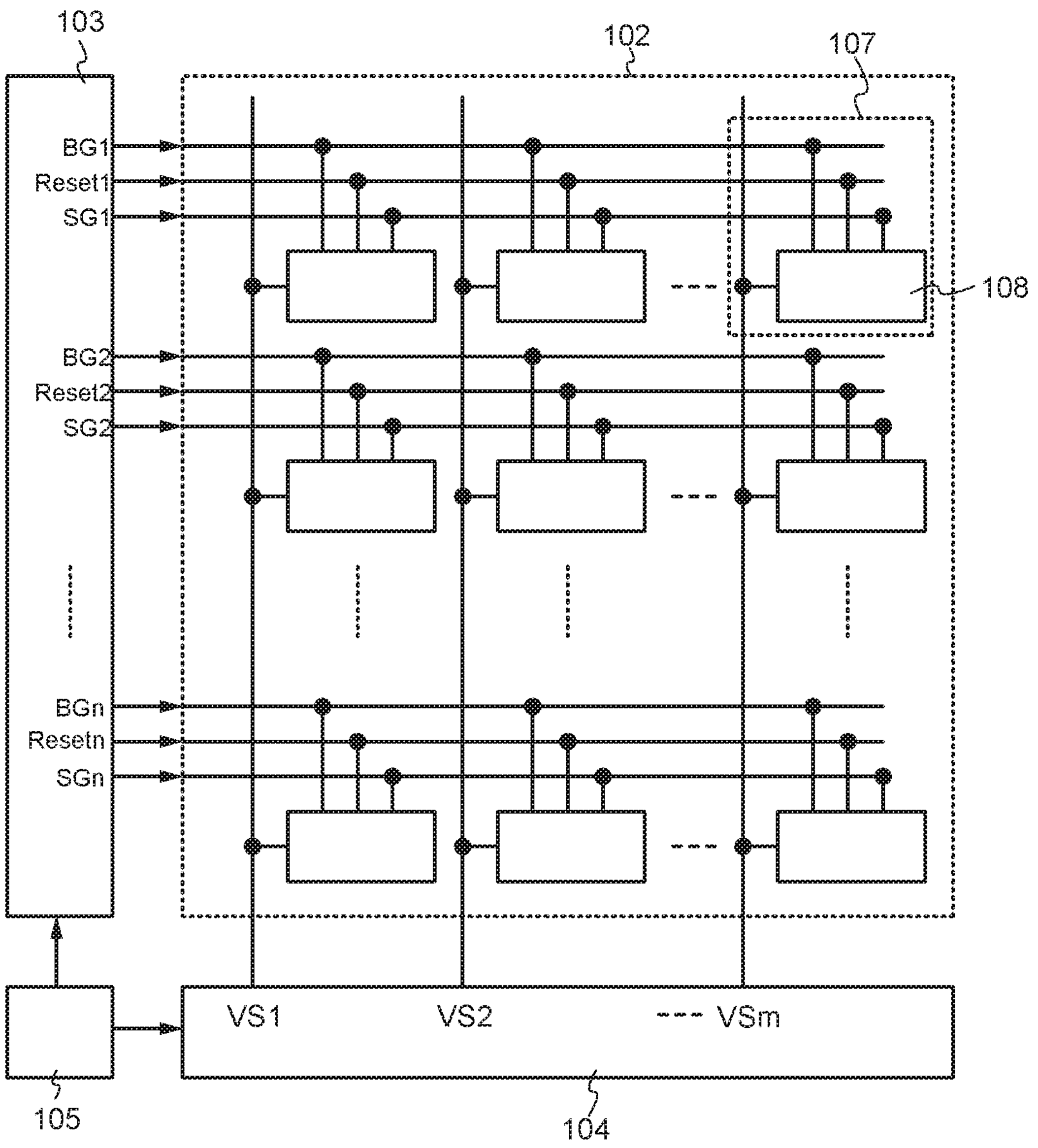
FIG. 2 is a diagram showing a circuit structure of the EL display device related to a first embodiment of the present invention.

FIG. 2 is a diagram showing a circuit structure of the EL display device 100 related to the first embodiment. A plurality of pixels 107 is arranged in a matrix shape in the display part 102 and an element 108 such as a transistor which forms each pixel is arranged in each pixel. In addition, a light emitting control gate signal (BG), a reset gate signal (Reset), and a signal selection gate signal (SG) are output to the display part 102 from the scanning wire drive circuit 103, and a video signal (VS) is output to the display part 102 from the video signal wire drive circuit 104. The logic circuit 105 outputs a control signal such as a timing signal to the scanning wire drive circuit 103 and video signal wire drive circuit 104.

Figure 3:
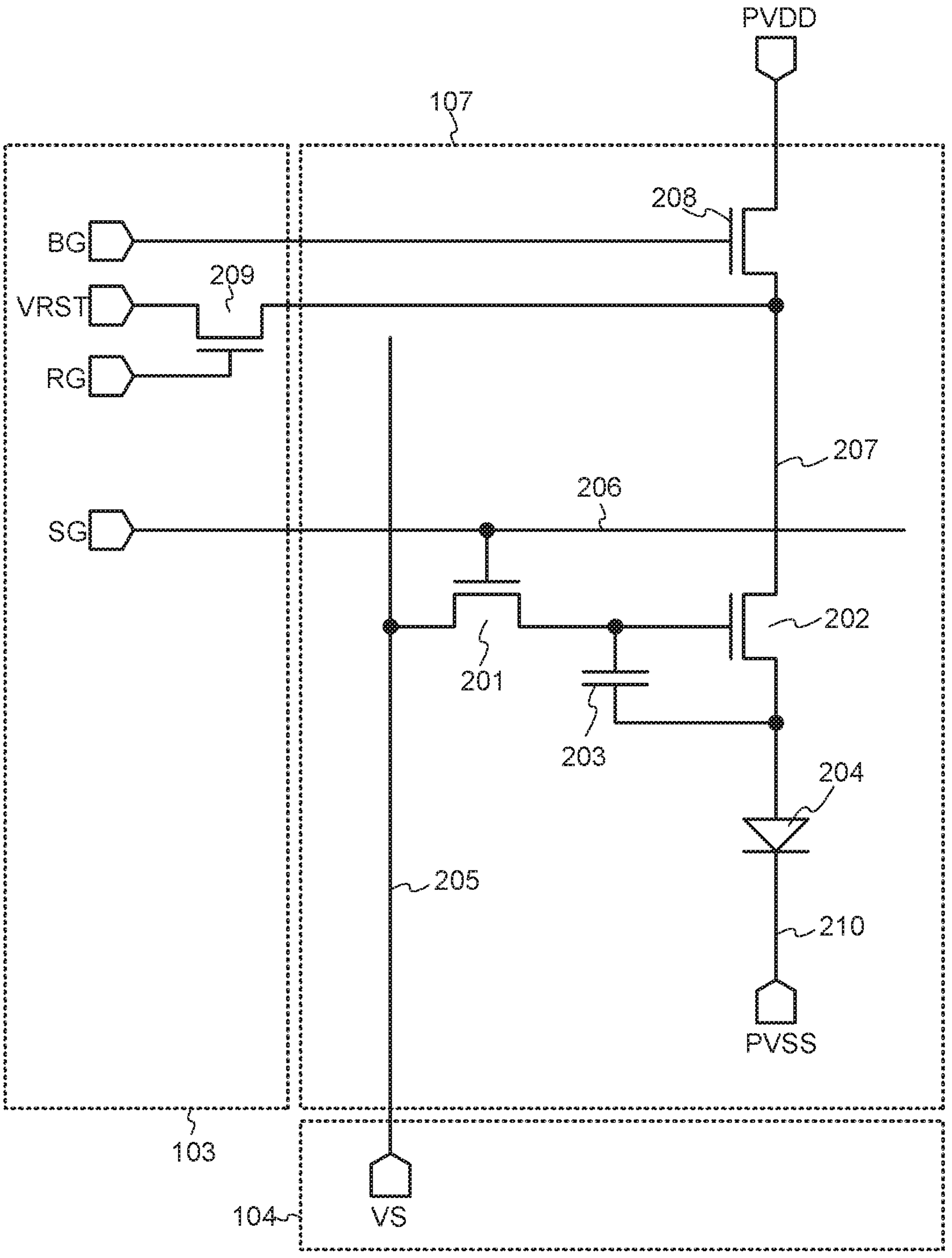
FIG. 3 is a diagram showing a structure of a pixel circuit of the EL display device related to a first embodiment of the present invention.

FIG. 3 is a diagram showing a structure of a pixel circuit of the EL display device 100 related to the first embodiment. Furthermore, in order to simplify explanation, only the structure of one pixel circuit is shown.

Two transistors 201, 202, one capacitor 203 and a light emitting element 204 are included in a pixel 107. The drain terminal (or source terminal) of the first transistor 201 is connected to the gate terminal of the second transistor 202 and the capacitor 203. In addition, the source terminal of the second transistor 202 is connected to the capacitor 203 and the light emitting element 204.

The video signal wire 205 is connected to the video signal wire drive circuit 104 and the source terminal (or drain terminal) of the first transistor 201. Although described below, a video signal (Vsig), an initial voltage (Vini) or a leak control voltage (Vleak) are supplied to the video signal wire 205. The signal selection gate wire 206 is connected to the scanning wire drive circuit 103 and the gate terminal of the first transistor 201, and is supplied with the signal selection gate signal (SG).

The first power supply wire 207 is connected to the anode of the light emitting element 204 via the second transistor 202. Furthermore, the first power supply wire 207 is connected to the drain terminal of the third transistor 208 and the drain terminal of the fourth transistor 209. The third transistor 208 and fourth transistor 209 do not have to be transistors as long as they are elements which include a switch function. The second power supply wire 210 is connected to the cathode of the light emitting element 204.

A first voltage (PVDD is supplied via the third transistor 208 or a second voltage (VRST) is supplied via the fourth transistor 209 to the first power supply wire 207. The first voltage is a fixed voltage output from a first power source (not shown in the diagram), and the second voltage is a fixed voltage output from a second power source (not shown in the diagram). In addition, a third voltage (PVSS) which is different to the first voltage and the second voltage is supplied to the second power supply wire 210. The third voltage is a fixed voltage output from a third power source (not shown in the diagram).

Furthermore, in the case where the second transistor 202 is an N channel type transistor, the first voltage, second voltage and third voltage have the following relationship: first voltage>second voltage>third voltage. That is, a relationship in which the second voltage is lower than the first voltage and the third voltage is lower than the second voltage is established.

The third transistor 208 can be arranged in common with respect to a plurality of pixels. For example, the third transistor 208 may be arranged in common with respect to four mutually adjacent pixels among a plurality of pixels arranged in a matrix shape. In addition, the fourth transistor 209 may be arranged in common with respect to pixels on each row, for example within the scanning wire drive circuit 103.

<Driving Method of an EL Display Device>

Before explaining a driving method of the EL display device 100 related to the first embodiment. A driving method of an EL display device shown in FIG. 11 previously explained as a comparative example is explained. Furthermore, although the driving method of the EL display device related to the first embodiment improves on the driving method of an EL display device which is a comparative example explained below, the structure of the driving method of the EL display device explained here is not essential.

Figure 4:
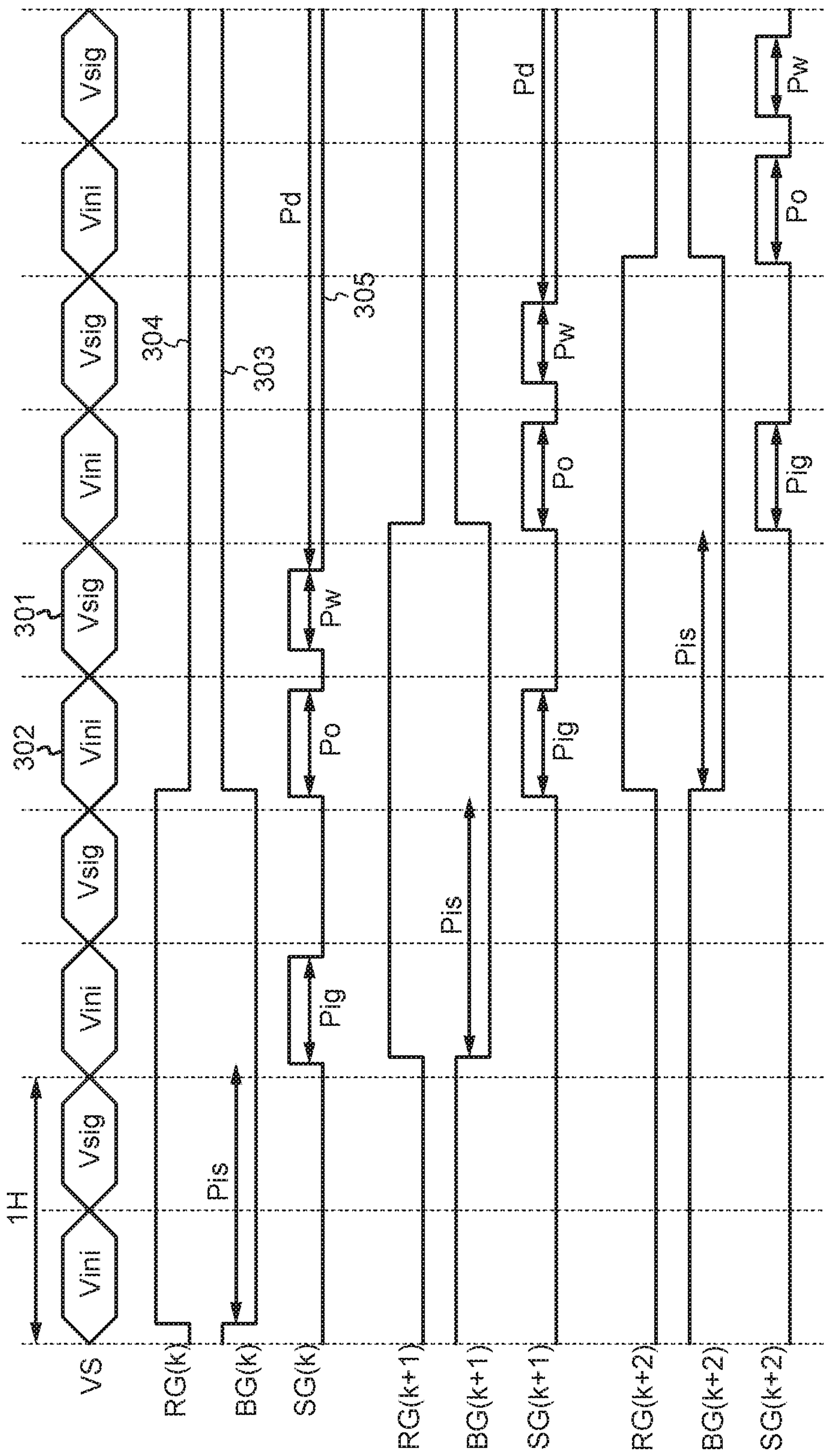
FIG. 4 is a diagram showing a time chart of a driving method in a conventional EL display device.

FIG. 4 is a diagram showing a time chart of a driving method in the EL display device explained as the comparative example. In FIG. 4, [1 H] means 1 horizontal scanning time period. In addition to a video signal (Vsig) as a video signal (VS: Video Signal), an initial voltage [Vini] is supplied to the video signal wire 205. Here, the time period 301 shown by [Vsig] is a time period in which the video signal (Vsig) is supplied to the video signal wire 205, and the time period 302 shown by [Vini] is a time period in which the initial voltage (Vini) is supplied.

Next, a time chart using a pixel on a kth row as an example is explained. The solid lines 303 and 304 each indicate a light emitting control gate signal (BGk) supplied to the gate terminal of the third transistor 208, and a reset gate signal (RGk) supplied to the gate terminal of the fourth transistor 209 respectively. In addition, the solid line 305 indicates a gate signal supplied to the signal selection gate signal (SGk) supplied to the gate terminal of the kth row first transistor 201.

First, an initial voltage (Vini) is supplied to the video signal wire 205, the light emitting control gate signal (BGk)

becomes a low level, and the reset gate signal (RGk) becomes a high level. That is, because the third transistor 208 becomes an OFF state and the fourth transistor 209 becomes an ON state, the second voltage (VRST) is supplied to the first power supply wire 207. For example, it is possible to set the second voltage (VRST) to −2V. As a result, the voltage of the source terminal and the drain terminal of the second transistor 202 (drive transistor) becomes the second voltage (VRST). By arranging this time period (Pis), the source terminal and drain terminal of the second transistor 202 return to an initial state.

When the initial voltage (Vini) is again supplied to the video signal wire 205 in the next 1 horizontal scanning time period, the signal selection gate signal (SGk) of the kth row signal selection gate wire 206 becomes a high level for a fixed time period. At this time, the first transistor 201 becomes an ON state and an initial voltage (Vini) is supplied to the gate terminal of the second transistor 202. For example, it is possible to set the initial voltage (Vini) to 2V. By arranging this time period (Pig), the gate terminal of the second transistor 202 return to an initial state.

As a result of the operations up to this point, initialization of the second transistor 202 is complete. The time period in which this series of reset operations is performed can be called a [reset time period].

When the initial voltage (Vini) is again supplied to the video signal wire 205 in the next 1 horizontal scanning time period, the light emitting control gate signal (BGk) becomes a high level and the reset gate signal (RGk) becomes a low level. That is, the third transistor 208 is switch to an ON state and the fourth second transistor 209 is switched to an OFF state. As a result, the first voltage (PVDD) is supplied to the first power supply wire 207 instead of the second voltage (VRST). For example, the first voltage (PVDD) can be set to 10V.

When the signal selection gate signal (SGk) is set to a high level in this state, each voltage of the gate terminal, source terminal and drain terminal of the second transistor 202 becomes an initial voltage (Vini), second voltage (VRST) and first voltage (PVDD respectively. As a result, a current flows between the source terminal and drain terminal of the second transistor 202, and the voltage f the source terminal rises gradually to a high voltage side from an initial voltage (Vini).

Lastly, the second transistor 202 becomes an OFF state at the point when the potential difference between the gate terminal and source terminal of the second transistor 202 becomes Vth (threshold voltage of the second transistor 202). That is, the second transistor 202 becomes an OFF state at the point when the voltage of the source terminal of the second transistor 202 rises to [Vini−Vth]. At this time, since a voltage corresponding to a threshold value (Vth) is stored in the capacitor 203, variation in the threshold value between pixels of the second transistor 202 is compensated. By arranging this time period (Po), variation in the threshold value between pixels of the second transistor 202 is corrected. The time period during which this series of operations is performed can be called a [OC (offset cancel) time period].

When a sufficient period of time has elapsed after offset cancel, the gate signal (SG) is set to a low level and the first transistor 201 is set to an OFF state. This time period is desired to be as long as possible so that the offset cancel operation is completely finished.

After the offset cancel operation is completed, a video signal (Vsig) is supplied to the video signal wire 205 and the signal selection gate signal (SGk) of the first transistor 201 is set to a high level. In this way, the video signal (Visg) is supplied to the gate terminal of the second transistor 202 via the first transistor 201. At this time, a voltage corresponding to the video signal (Vsig) and a voltage corresponding to the threshold voltage (Vth) of the second transistor are stored in the capacitor 203.

At this time, since the third transistor is in an ON state, the first voltage (PVDD) is supplied to the first power supply wire 207. As a result, a current flows via the second transistor 202 and a capacitor part (parasitic capacitance) of the light emitting element 204. By arranging this time period (Pw), the video signal (Visg) and a voltage based on a threshold voltage are written to the gate terminal of the second transistor 202, and variation in the level of mobility of the second transistor 202 between pixels is corrected. A time period in which this series of operations is performed can be called a [writing period].

Lastly, the signal selection gate signal (SGk) of the first transistor 201 is set to a low level and a display time period (Pd) is started. In this time period, the second transistor 202 flows a current value corresponding to the voltage written to the capacitor 203 and this current is supplied to the light emitting element 204. In this way, the light emitting element 204 emits light at a luminosity corresponding to the video signal (Vsig) and performs a display operation. The light emitting element 204 continues to emit light until the third transistor 208 becomes an OFF state again after a 1 frame time period.

As described above, a reset time period, an offset period, a writing time period and display time period are performed with respect to a kth row pixel. Following this, the same operations are repeated in sequence with respect to a k+1 row and k+2 row pixel, and by finally performing processing on all the pixels, it is possible to display an intended image.

Next, a driving method of the EL display device related to the first embodiment is explained. The difference of the driving method of the EL display device of the comparative example explained using FIG. 4 is that a leak control voltage (Vleak) is supplied to the video signal wire 205 in addition to the initial voltage (Vini) and video signal (Vsig).

Figure 5:
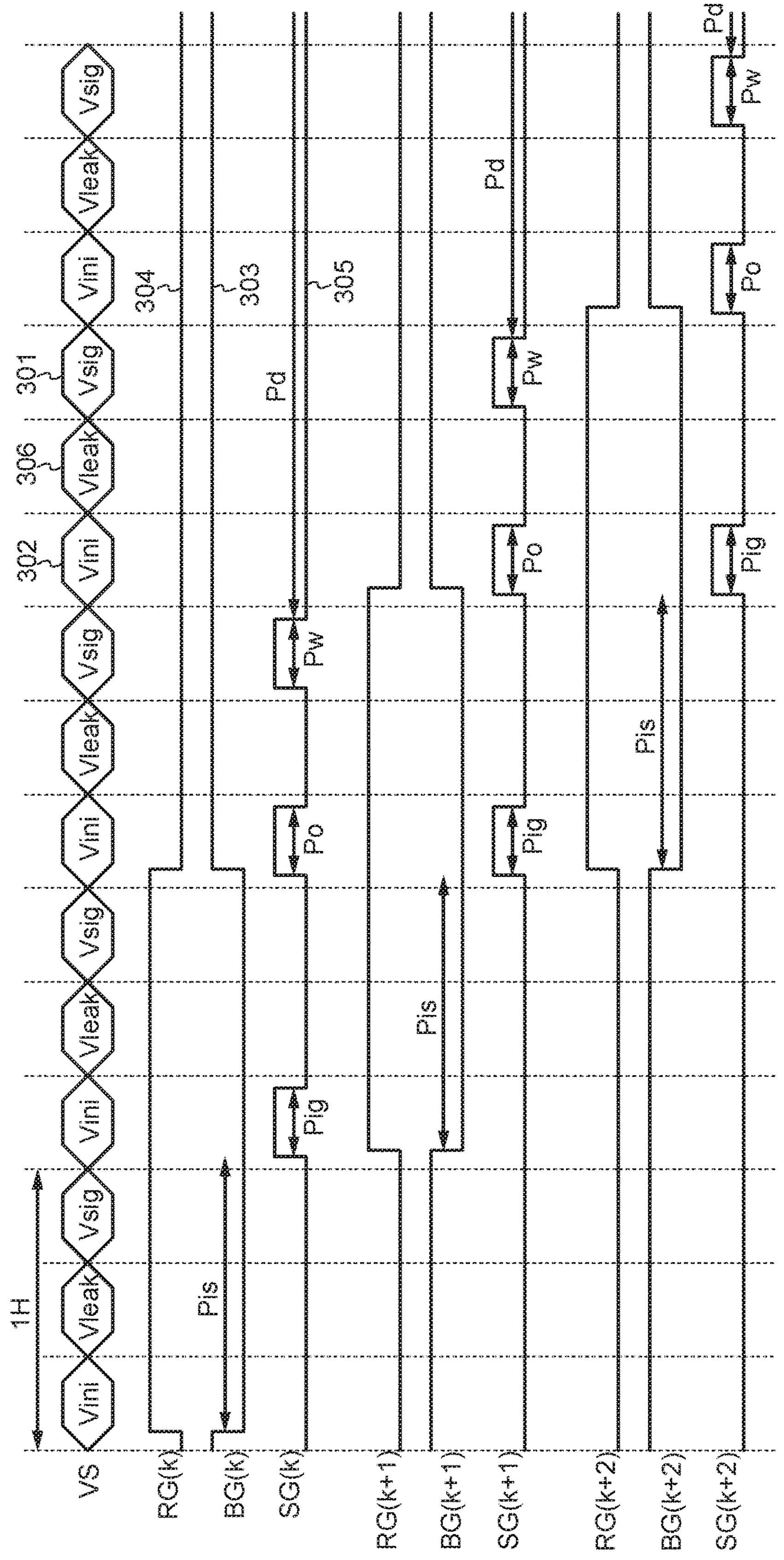
FIG. 5 is a diagram showing a time chart of a driving method in the EL display device related to a first embodiment of the present invention.

FIG. 5 is a diagram showing a time chart of a driving method in an EL display device related to the first embodiment. Unlike the driving method of the EL display device shown in FIG. 4, a time period 306 for supplying the leak control voltage (Vleak) is arranged between the time period 302 for supplying the initial voltage (Vini) to the video signal wire 205 and time period 301 for supplying the video signal (Vsig) to the video signal wire 205.

The leak control voltage (Vleak) may be a voltage lower than a minimum gradation level voltage which can be displayed by the EL display device of the present embodiment. Specifically, a voltage lower than a voltage to which 0.5V (preferably 0.3V) is added to a voltage corresponding to a minimum gradation (typically a voltage corresponding to a zero gradation) is supplied. For example, if the voltage corresponding to a minimum gradation is 0V, a voltage of 0.5V (preferably 0.3V) is supplied to the video signal wire 205 as the leak control voltage (Vleak).

In the present embodiment, the leak control voltage (Vleak) is supplied to the video signal wire 205 from the completion of a writing operation of a pixel on a certain row until a writing operation of a pixel on the next row begins. However, [next row] in this case is not limited to an adjacent row but may also be a next row spanning a plurality of rows. That is, the leak control voltage (Vleak) may be supplied to the video signal wire 205 for each of a plurality of rows. In addition, from another viewpoint, it is possible to say that a leak control voltage (Vleak) is supplied between an initial voltage (Vini) and the next initial voltage (Vini), or supplied between a reset operation and offset cancel operation in the present embodiment described above.

While the leak control voltage (Vleak) is supplied to the video signal wire 205, a plurality of first transistors 201 connected to the video signal wire 205 are all set to an OFF state in advance. In this way, a certain potential difference is produced between the capacitor 203 and video signal wire 205 (that is, between the source terminal and drain terminal of the first transistor 201), and a leak current is generated via the first transistor 201.

In the driving method of the EL display device of the present embodiment, by supplying a leak control voltage (that is, a voltage lower than a voltage of a minimum gradation level) to the video signal wire 205 at a certain timing, a leak current is deliberately generated via the first transistor 201. It is preferred that the supply of the leak control voltage is performed with respect to almost all pixels that form the display part 102. In this way, when a 1 frame time period is completed, the capacitor 203 of all the pixels supplied with a leak control voltage becomes a state in which a stored voltage drops uniformly by certain amount.

Figure 6:
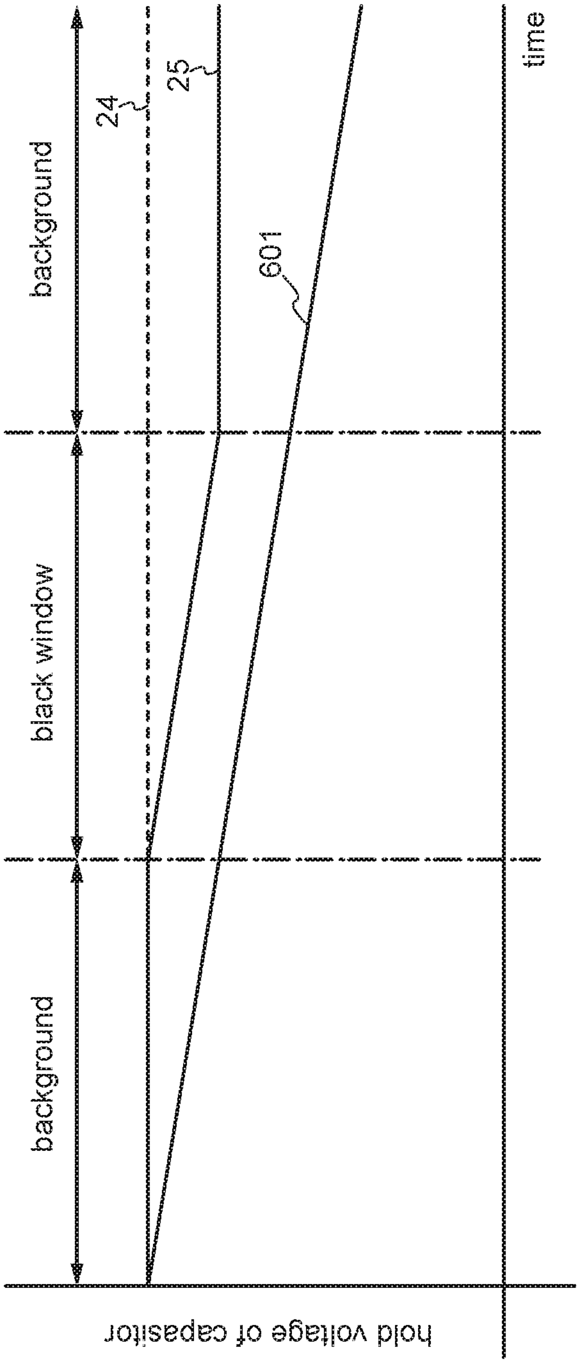
FIG. 6 is a diagram showing a time variation of a voltage stored by a capacitor 203 in a pixel at a specific coordinate.

FIG. 6 is a diagram showing a time variation of a voltage stored in the capacitor 203 in a pixel at a specific coordinate. Furthermore, a voltage variation (dotted line 24) of a capacitor in a pixel arranged in a column that does not include the black window explained in FIG. 14, and a voltage variation (solid line 25) of a capacitor in a pixel arranged in a column that includes the black window are shown as comparative examples.

In FIG. 6, the solid line 601 indicates a time variation of a capacitor in the case where the driving method of the EL display device of the present embodiment is used. In the present embodiment, since a stored voltage drops as is shown by the solid line 601 in a capacitor 203 of almost all the pixels, there is one direct line which shows a variation of a stored voltage.

As is shown in the solid line 601, a stored voltage in the capacitor 203 drops gradually at a certain incline over a 1 frame time period. The reason for this is that by regularly applying a leak control voltage (Vleak) to a video signal wire 205 in the present embodiment as is shown in FIG. 5, a certain amount of a voltage variation is caused according to a leak current. Therefore, by changing the value of a leak control voltage (Vleak) or by changing the number of times (timing) that a leak control voltage (Vleak) is supplied, it is possible to change the incline of the direct line shown by the solid line 601.

Cross talk explained using FIG. 13B occurs due to a difference (difference in a stored voltage) between the dotted line 24 and solid line 25 producing a difference in luminosity of a light emitting element. Reversely, if the luminosity of all pixels is decreased uniformly so that a luminosity difference which exceeds this luminosity difference is produced, the problem of cross talk does not occur. The driving method of the EL display device of the present embodiment is based on this conception, a stored voltage in a capacitor 203 is intentional decreased by generating a leak current uniformly in all pixels so that cross talk is not visible.

Here, it is though that variation in voltage produced in a capacitor 203 of a pixel positioned on an upper part of a back window depends in principle on the height of the black window (that is, the number of black pixels in a certain pixel column). As a result, a voltage variation which is intentionally produced in a capacitor 203 may be changed according to the height of the black window. That is, it is possible to change the value of a leak control voltage (Vleak) supplied to the video signal wire 205 or change the number of times (timing) that a leak control voltage (Vleak) is supplied according to the height of a black window. For example, it is possible to omit the supply of a leak control voltage (Vleak) in the case where it is judged that a back window does not exist. In addition, although an example is shown in FIG. 5 in which a leak control voltage (Vleak) is always supplied in 1 horizontal scanning time period, a leak control voltage (Vleak) may also be supplied for each of a plurality of horizontal scanning time periods.

In this way, the value of supply timing of the leak control voltage (Vleak) described above are merely examples and may be changed as appropriate. In addition, although an example was explained wherein a black window is displayed on a single color background, the present invention is not limited to this. The case where a pixel with a relatively large luminosity difference may be present on the same pixel column is also possible. Therefore, the driving method of the EL display device of the present embodiment can be realized without relying on an image pattern to be displayed.

As explained above, according to the driving method of the EL display device related to the first embodiment, by uniformly decreasing by a certain amount a voltage stored in a capacitor in almost all pixels which form a display part, it is possible to reduce the effects of a leak current that occurs with a voltage variation of a video signal wire. Therefore, it is possible to average a variation in voltage stored by a capacitor in each pixel and reduce the effects of cross talk which is locally generated.

Second Embodiment

Figure 7:
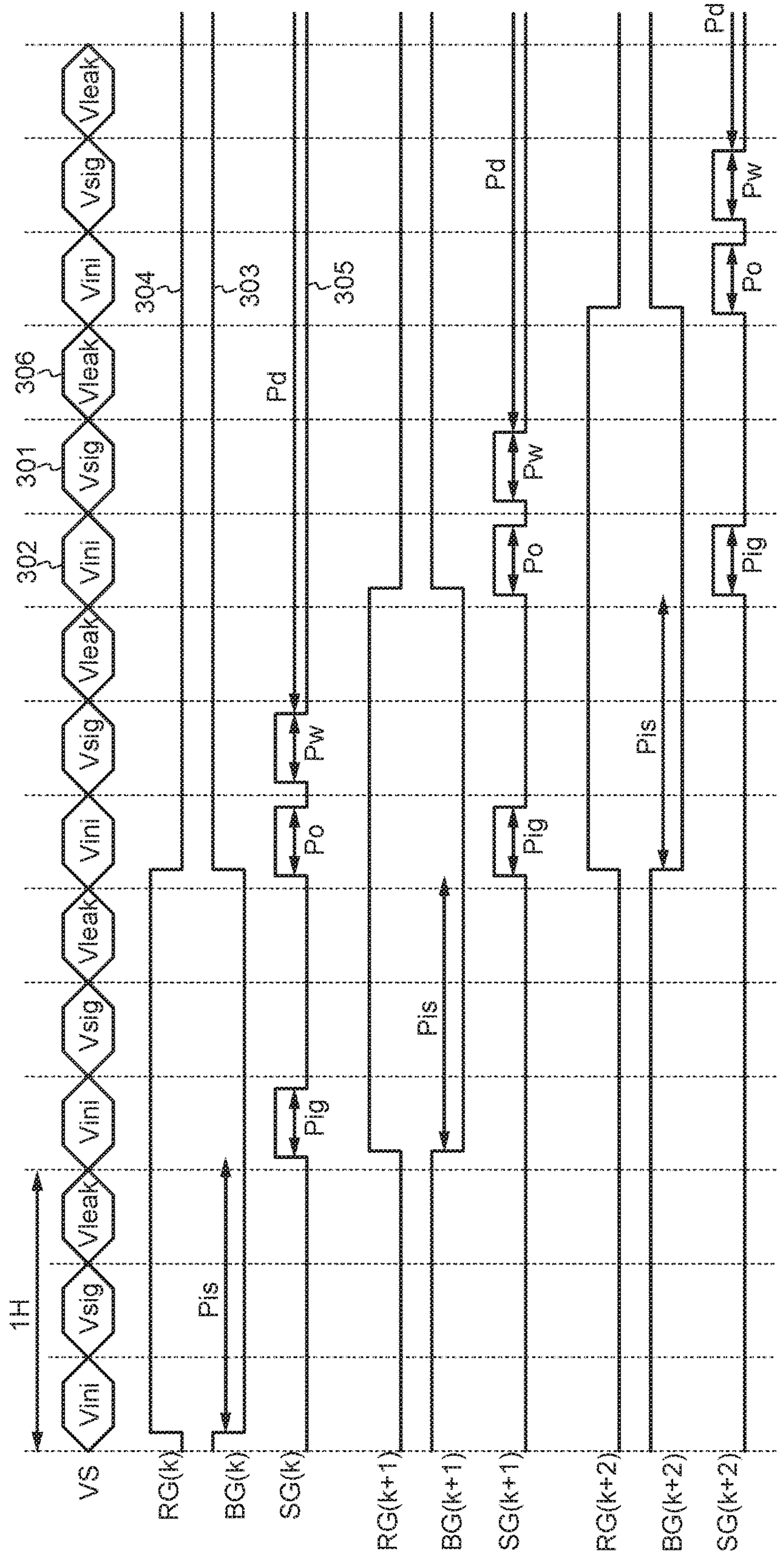
FIG. 7 is a diagram showing a time chart of a driving method in the EL display device related to one embodiment of the present invention.

FIG. 7 is a diagram showing a time chart of a driving method in an EL display device related to a second embodiment. The difference from the first embodiment is that in the driving method of the second embodiment, a time period 301 in which a video signal (Vsig) is supplied and a time period 306 in which a leak control voltage (Vleak) is supplied are replaced. Since the structure, basic driving method and other structures of the EL display device are the same as the EL display device 100 related to the first embodiment, any overlapping explanations are omitted.

As is shown in FIG. 7, by satisfying a basic structure in which a leak control voltage (Vleak) is supplied to a video signal wire 205 from when a writing operation of a pixel on a certain row is competed until a writing operation of a pixel on the next row begins, it is possible to appropriately determine the timing when the leak control voltage (Vleak) is supplied to the video signal wire 205.

In the driving method of the EL display device related to the second embodiment, by uniformly decreasing by a certain amount a voltage stored in a capacitor in almost all pixels which form a display part, it is possible to reduce the effects of a leak current that occurs with a voltage variation of a video signal wire. Therefore, it is possible to average a variation in voltage stored by a capacitor in each pixel and reduce the effects of cross talk which is locally generated.

Third Embodiment

Figure 8:
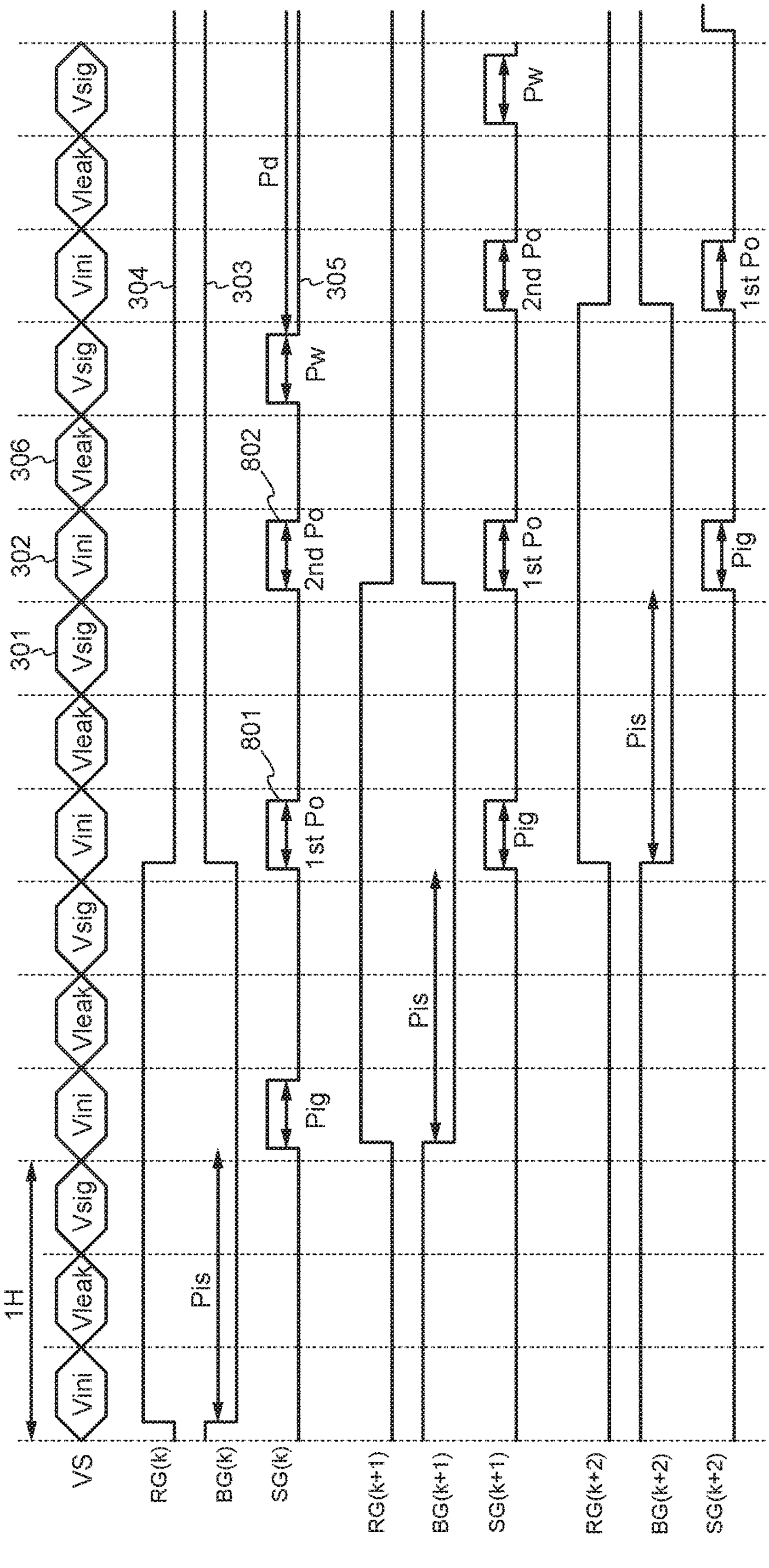
FIG. 8 is a diagram showing a time chart of a driving method in the EL display device related to one embodiment of the present invention.

FIG. 8 is a diagram showing a time chart of a driving method in an EL display device related to a third embodiment. The difference from the first embodiment is that in the driving method of the second embodiment, an offset cancel time period is divided into two. Since the structure, basic driving method and other structures of the EL display device are the same as the EL display device 100 related to the first embodiment, any overlapping explanations are omitted.

As is shown in FIG. 8, in the driving method of an EL display device of the present embodiment, after the first offset cancel time period 801 (1st Po), when an initial voltage (Vini) is again supplied to the video signal wire 205 in the next 1 horizontal scanning time period, the second offset cancel time period 802 ($2^{nd}$ Po) is performed. In addition, when the second offset cancel time period 802 is completed, a writing operation to the capacitor 203 is performed at a timing when the next video signal (Vsig) is supplied.

In the present embodiment, by dividing an offset cancel time into two, it is possible to secure a sufficiently long time for an offset cancel operation.

As high definition of EL display devices progresses, an offset cancel time period that can be inserted within 1 horizontal scanning time period becomes relatively short, and depending on the circumstances there is a danger that there is insufficient time for accurately storing a threshold voltage in the capacitor 203. However, in the present embodiment, since it is possible to secure a sufficient offset cancel time period even when high definition progresses, it is possible to more accurately cancel any variation in a threshold voltage of a second transistor 202 between pixels.

Therefore, according to the driving method of the EL display device related to the third embodiment, in addition to the effects explained in the first embodiment, it is possible to improve image quality by further suppressing threshold variation of a drive transistor between pixels.

Furthermore, in the driving method of the present embodiment, the time period 301 in which the video signal (Vsig) is supplied and the time period in which the leak control voltage (Vleak) is supplied may be replaced in combination with the second embodiment.

Fourth Embodiment

Figure 9:
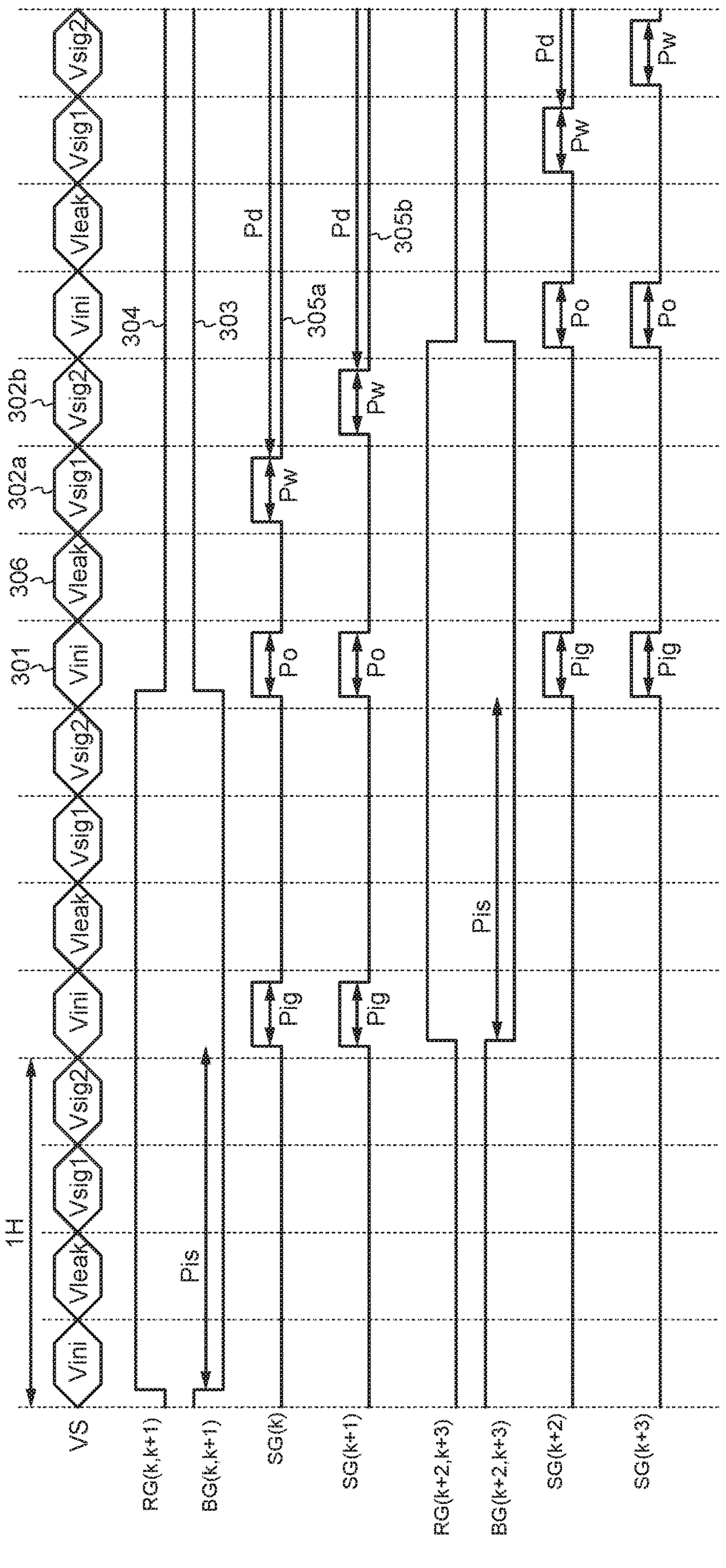
FIG. 9 is a diagram showing a time chart of a driving method in the EL display device related one first embodiment of the present invention.

FIG. 9 is a diagram showing a time chart of a driving method in an EL display device related to a fourth embodiment. The difference from the first embodiment is that in the driving method of the fourth embodiment, an initialization operation and an offset cancel operation are performed simultaneously on two rows. Since the structure, basic driving method and other structures of the EL display device are the same as the EL display device 100 related to the first embodiment, any overlapping explanations are omitted.

As is shown in FIG. 9, in the driving method of an EL display device of the present embodiment, a first video signal 302*a* (Vsig1) and a second video signal 302*b* (Vsig2) are included as video signals in 1 horizontal scanning time period. In addition, a signal selection gate signal 305*a* (SGk) supplied to a kth row pixel and a signal selection gate signal 305*b* (SGk+1) supplied to a k+1 row pixel are changed in the same phase with relation to an initialization operation and offset cancel operation of a gate terminal of the second transistor.

Therefore, in the driving method of the EL display device of the present embodiment, an initialization time period (Pis, Pig) and an offset cancel time period (P) of a kth row pixel, and an initialization time period (Pis, Pig) and an offset cancel time period (P) of a k+1 row pixel are commonly controlled.

In addition, after an offset cancel time period is completed, the signal selection gate signal 305*a* (SGk) becomes a high level first at a timing when the first video signal 302*a* (Vsig1) is supplied to the video signal wire 205, and a writing operation of a first video signal is performed to a capacitor 203 of a kth row pixel. Next, the signal selection gate signal 305*b* (SGk+1) becomes a high level at a timing when the second video signal 302*b* (Vsig2) is supplied to the video signal wire 205, and a writing operation of a second video signal is performed to a capacitor 203 of a k+1 row pixel.

As explained above, according to the driving method of an EL display device of the preset embodiment, since it is possible to carry out an initialization time period and offset cancel time period when preparing a light emitting operation simultaneously on two rows, it is possible to sufficiently secure the length of each time period. Therefore, in addition to the effects explained in the first embodiment, it is possible to improve image quality by further suppressing any variation in the characteristics in a drive transistor between pixels.

Furthermore, although the driving method of the present embodiment showed an example in which pixels on two rows are commonly controlled, the present invention is not limited to this. It is possible to commonly control pixels on a plurality of rows such as commonly controlling pixels on four rows. In addition, it is possible to realize the invention by appropriately combining the second embodiment and third embodiment.

Fifth Embodiment

Figure 10:
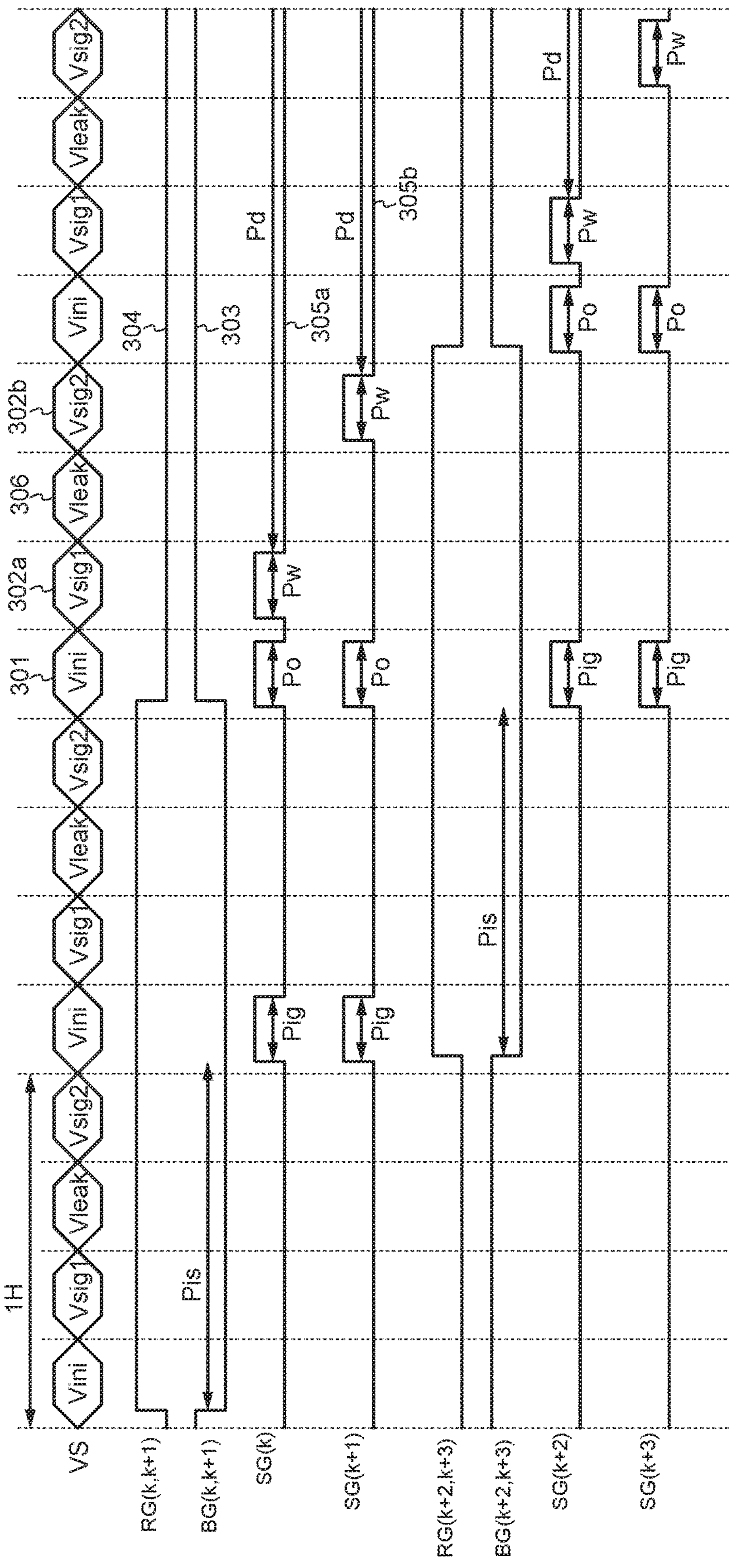
FIG. 10 is a diagram showing a time chart of a driving method in the EL display device related one first embodiment of the present invention.

FIG. 10 is a diagram showing a time chart of a driving method in an EL display device related to a fifth embodiment. In the driving method of the fifth embodiment, an initialization operation and offset cancel operation are performed simultaneously on two rows the same as the driving method of the fourth embodiment. The difference from the driving method of the fourth embodiment is that a time period for supplying a leak control voltage (Vleak) is arranged between the time period 302*a* for supplying a first video signal (Vsig1) to the video signal wire 205 and a time period 302*b* for supplying a second video signal (Vsig2) to the video signal wire 205. Since the structure, basic driving method and other structures of the EL display device are the same as the EL display device 100 related to the first embodiment, any overlapping explanations are omitted.

Also in this case, the basic structure is satisfied in which a leak control voltage (Vleak) is supplied to a video signal wire 205 from when a writing operation of a pixel on a certain row is competed until a writing operation of a pixel on the next row begins.

Specifically, a time period is included in which the leak control voltage (Vleak) is supplied to the video signal wire 205 after the first video signal (Vsig1) is written to a kth row pixel, until the first signal (Vsig1) is written to the next k+2 row pixel. Similarly, a time period is included in which the leak control voltage (Vleak) is supplied to the video signal wire 205 after the second video signal (Vsig2) is written to a k+1 row pixel, until the second signal (Vsig2) is written to the next k+3 row pixel.

Therefore, according to the driving method of the EL display device related to the present embodiment, the same as the fourth embodiment in addition to the effects explained in the first embodiment, it is possible to improve image quality by further suppressing variation in the characteristics of a drive transistor between pixels.

Furthermore, although the driving method of the present embodiment showed an example in which pixels on two rows are commonly controlled, the present invention is not limited to this. It is possible to commonly control pixels on a plurality of rows such as commonly controlling pixels on four rows. In addition, it is possible to realize the invention by appropriately combining the second embodiment and third embodiment.

Although a person skilled in the art of the present invention could appropriately add, remove or change the design of structural elements or add, omit or change the conditions of processes based on the EL display device explained as an embodiment of the present invention, as long as the gist of the present invention is provided, these are included in the scope of the present invention.

In addition, other operational effects which are different to the operational effects brought about by the embodiments described above, those that are obvious from the descriptions in the present specification or those that could easily be predicted by a person ordinarily skilled in the art are also to be interpreted as being brought about by the present invention.

What is claimed is:

1. A method of driving a display device arranged with a display part including a plurality of pixels comprising:

at least one pixel of the plurality of pixels includes a video signal wire;

a first power supply wire supplied with a first potential;

a second power supply wire supplied with a second potential different to the first potential;

a light emitting element arranged between the first power supply wire and the second power supply wire;

a drive transistor arranged between the first power supply wire and the light emitting element, and controlling a value of a current supplied to the light emitting element;

a switch arranged between the video signal wire and a gate terminal of the drive transistor, and inputting a signal of the video signal wire to the gate terminal of the drive transistor; and a capacitor arranged between the gate terminal and a source terminal of the drive transistor;

a minimum gradation level potential is supplied to the video signal wire after a video signal is written to the capacitor of an Nth row pixel until a video signal is written to the capacitor of an Mth (N<M) row pixel.

2. The method of driving a display device according to claim 1, wherein the minimum gradation level potential is a potential lower than a potential added with 0.5V to a potential corresponding to a minimum gradation.

3. The method of driving a display device according to claim 1, wherein the minimum gradation level potential is a potential of 0.5V or less.

4. The method of driving a display device according to claim 1, wherein the switch connected to the video signal wire is maintained in an OFF state while the minimum gradation level potential is supplied to the video signal wire.

5. The method of driving a display device according to claim 1, wherein the minimum gradation level potential is supplied to a plurality of rows with respect to the video signal wire.

6. A method of driving a display device arranged with a display part including a plurality of pixels comprising:

at least one pixel of the plurality of pixels includes a video signal wire;

a first power supply wire is supplied mutually exclusively with a first potential or a second potential different to the first potential;

a second power supply wire supplied with a third potential different to the first potential and second potential;

a light emitting element arranged between the first power supply wire and the second power supply wire;

a drive transistor arranged between the first power supply wire and the light emitting element, and controlling a value of a current supplied to the light emitting element;

a switch arranged between the video signal wire and a gate terminal of the drive transistor, and inputting a signal of the video signal wire to the gate terminal of the drive transistor; and a capacitor arranged between the gate terminal and a source terminal of the drive transistor;

a minimum gradation level potential is supplied to the video signal wire after a video signal is written to the capacitor of an Nth row pixel until a video signal is written to the capacitor of an Mth (N<M) row pixel.

7. The method of driving a display device according to claim 6, wherein the minimum gradation level potential is a potential lower than a potential added with 0.5V to a potential corresponding to a minimum gradation.

8. The method of driving a display device according to claim 6, wherein the minimum gradation level potential is a potential of 0.5V or less.

9. The method of driving a display device according to claim 6, wherein the switch connected to the video signal wire is maintained in an OFF state while the minimum gradation level potential is supplied to the video signal wire.

10. The method of driving a display device according to claim 6, wherein the minimum gradation level potential is supplied to a plurality of rows with respect to the video signal wire.

11. The method of driving a display device according to claim 6, wherein a reset operation or offset cancel operation is performed while an initial potential is supplied to the video signal wire, and the minimum gradation level potential is supplied to the video signal wire between the reset operation and offset cancel operation.

12. The method of driving a display device according to claim 11, wherein the reset operation and offset cancel operation are performed collectively for a plurality of rows.

13. The method of driving a display device according to claim 12, wherein the minimum gradation level potential is supplied to the video signal wire after a video signal is written to the capacitor of the Nth row pixel until a video signal is written to the capacitor of an N+1th row pixel.

14. The method of driving a display device according to claim 11, wherein the minimum gradation level potential is supplied to the video signal wire after the initial potential is written to the capacitor of the Nth row pixel until the initial potential is written to the capacitor of an Mth (N<M) row pixel.

* * * * *